United States Patent
Rundqvist (10) Patent No.: US 11,067,021 B2
(45) Date of Patent: Jul. 20, 2021

(54) DETERMINATION OF PRESSURIZED FUEL TEMPERATURE

(71) Applicant: Scania CV AB, Södertälje (SE)

(72) Inventor: Erik Rundqvist, Stockholm (SE)

(73) Assignee: Scania CV AB, Södertälje (SE)

( * ) Notice: Subject to any disclaimer, the term of this patent is extended or adjusted under 35 U.S.C. 154(b) by 394 days.

(21) Appl. No.: 16/311,234

(22) PCT Filed: Jun. 19, 2017

(86) PCT No.: PCT/SE2017/050658
§ 371 (c)(1),
(2) Date: Dec. 19, 2018

(87) PCT Pub. No.: WO2018/004426
PCT Pub. Date: Jan. 4, 2018

(65) Prior Publication Data
US 2019/0186398 A1    Jun. 20, 2019

(30) Foreign Application Priority Data

Jun. 27, 2016 (SE) .................................... 1650914-3

(51) Int. Cl.
*F02D 41/14* (2006.01)
*F02D 41/38* (2006.01)
(Continued)

(52) U.S. Cl.
CPC .......... *F02D 41/1401* (2013.01); *B60K 15/00* (2013.01); *F02D 41/345* (2013.01);
(Continued)

(58) Field of Classification Search
CPC ............... F02D 41/1401; F02D 41/345; F02D 41/3809; F02D 41/30; F02D 41/38;
(Continued)

(56) References Cited

U.S. PATENT DOCUMENTS 6,708,671 B1 *   3/2004   Joos .................... F02D 41/1401
                                                                 123/464
7,082,928 B2     8/2006   Fritsch et al.
(Continued)

FOREIGN PATENT DOCUMENTS

DE   102007053082 A1   5/2009
DE   102012220949 B3   2/2014
(Continued)

OTHER PUBLICATIONS

SCANIA CV AB, European Application No. 17820645.4, Extended European Search Report, dated Jan. 21, 2020.
(Continued)

*Primary Examiner* — George C Jin
(74) *Attorney, Agent, or Firm* — Moore & Van Allen PLLC; W. Kevin Ransom (57) ABSTRACT

A method and a system for determining a temperature for pressurized fuel included in a high pressure fuel system arranged for providing fuel to an engine are presented. The method includes determining a first temperature for a first fuel volume included in a first section of the high pressure fuel system, where the first section includes a common rail fuel system. The method further includes determining a second temperature for a second fuel volume included in a second section of the high pressure fuel system, where the second section includes at least one fuel injector arranged in a cylinder head of the engine. The method also includes the step of determining the temperature for the pressurized fuel based at least on the first temperature and on the second temperature.

15 Claims, 4 Drawing Sheets

(51) Int. Cl.
G01K 7/42 (2006.01)
F02D 41/34 (2006.01)
B60K 15/00 (2006.01)
F02M 65/00 (2006.01)
B60K 15/01 (2006.01)
B60K 15/03 (2006.01)

(52) U.S. Cl.
CPC ......... F02D 41/3809 (2013.01); F02M 65/00 (2013.01); F02M 65/001 (2013.01); G01K 7/427 (2013.01); B60K 15/01 (2013.01); B60K 15/03 (2013.01); B60K 2015/0321 (2013.01); F02D 2041/1433 (2013.01); F02D 2200/021 (2013.01); F02D 2200/0602 (2013.01); F02D 2200/0606 (2013.01); F02D 2200/0616 (2013.01); F02D 2200/501 (2013.01); F02D 2200/70 (2013.01); F02D 2250/04 (2013.01); G01K 2205/00 (2013.01); Y02T 10/40 (2013.01)

(58) Field of Classification Search
CPC ......... F02D 2250/04; F02D 2200/0616; F02D 2200/0606; F02D 2200/0602; F02D 2200/0321; F02D 2200/021; F02D 2200/501; F02D 2200/70; F02D 2041/1433; B60K 2015/0321; B60K 15/00; B60K 15/01; B60K 15/03; F02M 65/00; F02M 65/001; G01K 7/427; G01K 7/00; G01K 2205/00; G01N 25/00
See application file for complete search history.

(56) References Cited

U.S. PATENT DOCUMENTS

| | | | |
|---|---|---|---|
| 8,532,869 B2 | 9/2013 | Kimoto et al. | |
| 9,127,586 B2 | 9/2015 | Adachi | |
| 2006/0144131 A1* | 7/2006 | Schulz | F02D 41/3809 73/114.43 |
| 2007/0277786 A1 | 12/2007 | Barnes et al. | |
| 2009/0139499 A1* | 6/2009 | Barra | F02D 41/3809 123/552 |
| 2010/0125400 A1 | 5/2010 | McDonald et al. | |
| 2011/0100329 A1* | 5/2011 | Li | G01K 11/00 123/445 |
| 2012/0203447 A1* | 8/2012 | Kammerstetter | F02D 41/22 701/104 |
| 2015/0078413 A1* | 3/2015 | Heinrich | F02M 65/00 374/1 |
| 2015/0276505 A1* | 10/2015 | Kobayashi | G01K 11/00 374/1 |
| 2019/0186398 A1* | 6/2019 | Rundqvist | G01K 7/427 |

FOREIGN PATENT DOCUMENTS

| | | |
|---|---|---|
| EP | 1088982 A2 | 4/2001 |
| EP | 2343526 A2 | 7/2011 |
| EP | 2735719 A1 | 5/2014 |
| FR | 2994714 A1 | 2/2014 |
| KR | 1020150136385 | 5/2014 |
| SE | 524506 | 5/2014 |
| WO | 2004094804 A1 | 11/2004 |

OTHER PUBLICATIONS

SCANIA CV AB, Korean Application No. 10-2019-7000826, Office Action, dated Jan. 2, 2020.
International Preliminary Report on Patentability for International Patent Application No. PCT/SE2017/050658 dated Jan. 1, 2019.
International Search Report for International Patent Application No. PCT/SE2017/050658 dated Sep. 19, 2017.
Written Opinion of the International Searching Authority for International Patent Application No. PCT/SE2017/050658 dated Sep. 19, 2017.

* cited by examiner

DETERMINATION OF PRESSURIZED FUEL TEMPERATURE

CROSS-REFERENCE TO RELATED APPLICATIONS

This application is a national stage application (filed under 35 § U.S.C. 371) of PCT/SE2017/050658, filed Jun. 19, 2017 of the same title, which, in turn, claims priority to Swedish Application No. 1650914-3 filed Jun. 27, 2016; the contents of each of which are hereby incorporated by reference.

FIELD OF THE INVENTION

The present invention relates to a method, system and computer program product for determining a temperature $T_{tot}$ for pressurized fuel included in a high pressure fuel system.

BACKGROUND OF THE INVENTION

The following background information is a description of the background of the present invention, which thus not necessarily has to be a description of prior art.

Combustion engines, such as e.g. combustions engines included in vehicles or vessels, are driven by fuel, such as e.g. diesel, gasoline, ethanol, or mixtures of such fuel types. The fuel is provided to the engine by a fuel system, including among other components fuel tanks and arrangements transporting the fuel from the fuel tanks to the engine.

The arrangements transporting the fuel to the engine may include e.g. one or more fuel pumps, possibly being comprised in a low pressure fuel system or in a high pressure fuel system. The arrangements may also include filters, piping and pipe couplings.

The fuel is injected into the cylinders of the engine by a fuel injection system e.g. including one injector per cylinder. The injectors may be provided with the fuel to be injected from a common rail fuel system. The common rail fuel system is arranged for providing pressurized fuel to all injectors. The fuel is then consumed/combusted within the cylinders of the engine.

It is important to be able to determine how much fuel being injected into the engine. The amount/weight of the fuel being injected can be used as a parameter for a number control/adaption methods in an engine control system. The injected amount of fuel can also be used as a parameter in other control systems e.g. in a vehicle. It is, however, very difficult to directly measure how much fuel is injected into the engine.

The weight Q of the injected fuel during an injection generally depends at least on the pressure P of the fuel being injected and on the length of an injection time period $T_i$; $Q=f(T_i, P)$. Therefore, the weight $Q_{est}$ of the injected fuel is often estimated based on measurements of pressure drops $\Delta P$ that occur for the fuel in the common rail when an injection is made, and on a scaling factor. The scaling factor depends on a volume V of the pressurized fuel and on the speed of sound c for the fuel. The fuel weight can then be calculated as $$Q_{est} = \frac{V}{c^2} * \Delta P,$$

where $$\frac{V}{c^2}$$

is the scaling factor. The speed of sound c here depends on fuel characteristics, such as pressure P and a mean temperature $T_{tot}$ for the pressurized fuel. The mean temperature T may here be the mean temperature for all pressurized fuel in the high pressure fuel system, from a high pressure pump creating the high pressure for the pressurized fuel and to the injectors injecting the fuel into the engine.

SUMMARY OF INVENTION

Thus, for a fuel system including a common rail fuel system, the pressure drops $\Delta P$ for the fuel in the rail during injections can be used as indications for the weight/amount $Q_{est}$ of fuel being injected into the engine during the injections. To be able to estimate the injected fuel weight $Q_{est}$ by use of the above mentioned equation $$Q_{est} = \frac{V}{c^2} * \Delta P,$$

the mean temperature $T_{tot}$ must be known, since the mean temperature influences the scaling factor $$\frac{V}{c^2}.$$

It is, however, difficult to measure the temperature $T_{tot}$ directly in the fuel because of the high pressure of the fuel within the high pressure fuel system. It is very difficult and costly to design temperature sensors that can be used under such hard high pressure conditions. Also, usage of direct measuring of the temperature by use of one temperature sensor would result in a temperature value only in one specific point in the high pressure fuel system, whereas the temperature needed for estimating the injected fuel weight $Q_{est}$ is the mean temperature $T_{tot}$ for all fuel in the high pressure fuel system. It is thus difficult and costly to determine the mean temperature $T_{tot}$ for the fuel, which is needed for determining the injected fuel weight $Q_{est}$.

It is therefore an object to solve at least some of the above mentioned problems.

According to an aspect of the present invention, the object is achieved by the above mentioned method for determining a temperature $T_{tot}$ for pressurized fuel included in a high pressure fuel system arranged for providing fuel to an engine.

The method includes the step of determining a first temperature $T_1$ for a first fuel volume $V_1$ included in a first section of the high pressure fuel system, where the first section includes a common rail fuel system.

The method further includes determining a second temperature $T_2$ for a second fuel volume $V_2$ included in a second section of the high pressure fuel system, where the second section includes at least one fuel injector arranged in a cylinder head of the engine.

The method also includes the step of determining the temperature $T_{tot}$ for the pressurized fuel based at least on the first temperature $T_1$ and on the second temperature $T_2$; $T_{tot}=f(T_1, T_2)$.

The fuel temperature determination according to the present invention thus includes determining the first temperature $T_1$ for the first section of the high pressure fuel system and the second temperature $T_2$ for the second section of the high pressure fuel system. Thereafter, these first $T_1$ and second $T_2$ determined temperatures are used for determining the total temperature $T_{tot}$ for the fuel in the high pressure fuel system. The total temperature $T_{tot}$ can therefore be defined as a mean temperature for all the fuel in the high pressure fuel system, which is the temperature needed for the estimation of the fuel weight/amount $Q_{est}$ being injected into the engine (as described above). Thus, since a reliable mean value for the fuel temperature in the high pressure fuel system is provided by the present invention, the injected fuel weight/amount $Q_{est}$ can easily and reliably be estimated.

When the present invention is used, the mean temperature of the pressurized fuel can continuously be determined. The continuously determined mean temperature may then be used by control systems e.g. in vehicles for a large number of calculations and/or adaptions. For example, the fuel weight/amount $Q_{est}$ being injected by the injectors may be estimated, as mentioned above. Alternatively, if a reliable value for the injected fuel weight/amount $Q_{est}$ has already been estimated, it may also be possible to determine which type of fuel, e.g. diesel, gasoline, ethanol or a mixture of these types, being present in the high pressure fuel system.

The fuel temperature determination according to the embodiment of the present invention can be implemented with very little addition to the hardware complexity of e.g. a vehicle including the engine and the high pressure fuel system, since the mean temperature can be determined based on signals from temperature sensors either being already present, such as a coolant temperature sensor, or being easily replaced, such as a common rail pressure sensor being exchanged with a combined pressure and temperature sensor, in e.g. a vehicle engine system. The fuel temperature determination according to some embodiments of the present invention does especially not need to utilize a temperature sensor being in direct contact with, i.e. being submerged into, the pressurized fuel, which makes the contribution to the hardware complexity very little for the embodiments, and also makes the production costs lower.

According to an embodiment of the present invention, the determining of the temperature $T_{tot}$ includes weighting the first temperature $T_1$ with the first volume $V_1$ and weighting the second temperature $T_2$ with the second volume $V_2$;

$$T_{tot} = \frac{T_1 * V_1 + T_2 * V_2}{V_1 + V_2}.$$

Hereby, a more exact determination of the temperature $T_{tot}$ is provided, which takes the possibly differing first $V_1$ and second $V_2$ volumes into consideration. It should be noted that the first $V_1$ and second $V_2$ volumes may differ for different vehicle types and/or for vehicle individuals of the same type. Also, the first $V_1$ and second $V_2$ volumes may vary over time. For all these cases, this embodiment provides an exact estimation of the temperature $T_{tot}$.

As described below, the determination of the temperature $T_{tot}$ may also be based on more than two sections/volumes. The size of each one of these sections/volumes may then also be used for weighting the corresponding section temperatures.

According to an embodiment of the present invention, the temperature $T_{tot}$ is determined as a mean temperature $T_{mean}$; $T_{tot} = T_{mean}$; for a total volume $V_{tot}$ of the pressurized fuel included in the high pressure fuel system. Since the mean temperature $T_{mean}$ is hereby determined, the fuel weight/amount $Q_{est}$ being injected by the injectors may be estimated directly based on this mean temperature $T_{mean}$.

According to an embodiment of the present invention, the determination of the first temperature $T_1$ includes measuring a rail body temperature $T_{rail\_body}$ for the common rail fuel system, and then determining the first temperature $T_1$ based on the rail body temperature $T_{rail\_body}$. Hereby, a cost effective and low complexity solution utilising indirect determination of the first temperature $T_1$ is provided.

According to an embodiment of the present invention, the determination of the first temperature $T_1$ includes direct measurement of a fuel temperature $T_{rail\_fuel}$ for fuel within the common rail fuel system. Hereby, a quick and exact determination of the first temperature $T_1$ is provided.

According to an embodiment of the present invention, the determination of the second temperature $T_2$ includes measuring at least one injector body temperature $T_{inject\_body}$ for the at least one injector, and determining the second temperature $T_2$ based on the at least one injector body temperature $T_{inject\_body}$. Hereby, a cost effective and low complexity solution utilising indirect determination of the second temperature $T_2$ is provided.

According to an embodiment of the present invention, the determination of the second temperature $T_2$ includes a direct measurement of at least one fuel temperature $T_{inject\_fuel}$ for fuel within at the least one fuel injector. Hereby, a quick and exact determination of the second temperature $T_2$ is provided According to an embodiment of the present invention, the determination of the second temperature $T_2$ includes measuring at least one coolant temperature $T_{coolant}$ for coolant water flowing through the cylinder head, and determining the second temperature $T_2$ based on the at least one coolant temperature $T_{coolant}$. Hereby, a cost effective and low complexity solution utilising indirect determination of the second temperature $T_2$ is provided.

According to an embodiment of the present invention, the determination of the temperature $T_{tot}$ for the pressurized fuel is based also on at least one additional parameter $Par_{add}$ being related to the fuel system and/or to a vehicle in which the high pressure fuel system is included; $T_{tot} = f(T_1, T_2, Par_{add})$. By taking also the one or more additional parameters $Par_{add}$ into account, a more exact determination of the temperature $T_{tot}$ is achieved.

According to an embodiment of the present invention, the at least one additional parameter $Par_{add}$ includes one or more in the group of:
 a fuel flow through the high pressure fuel system;
 a placement of the high pressure fuel system;
 a layout for an engine house in which the high pressure fuel system is located;
 an effect of a cooling fan of a cooling system arranged for cooling the engine;
 an environmental temperature surrounding the high pressure fuel system;
 a cooling effect on the high pressure fuel system provided by surrounding air;
 a velocity of the vehicle; and
 a pressure of the fuel, which influences the fuel temperature.

According to another aspect of the present invention, the object is achieved by the above mentioned computer program and computer program product implementing the method according to the present invention and its embodiments.

According to another aspect of the present invention, the object is achieved by the above mentioned system for determining a temperature $T_{tot}$ for pressurized fuel included in a high pressure fuel system arranged for providing fuel to an engine.

The system includes a first determining unit arranged for determining a first temperature $T_1$ for a first fuel volume $V_1$ included in a first section of the high pressure fuel system, where the first section includes a common rail fuel system.

The system also includes a second determining unit arranged for determining a second temperature $T_2$ for a second fuel volume $V_2$ included in a second section of the high pressure fuel system, where the second section includes at least one fuel injector arranged in a cylinder head of the engine.

The system further includes a third determining unit arranged for determining the temperature $T_{tot}$ for the pressurized fuel based at least on the first determined temperature $T_1$ and on the second determined temperature $T_2$; $T_{tot} = f(T_1, T_2)$.

The system has the advantages mentioned above for the method according to the present invention.

According to an embodiment of the present invention, the first determining unit utilizes, e.g. by receiving signals from, at least one sensor in the group of:
- a temperature sensor embedded in material of a body of the common rail fuel system;
- a temperature sensor attached to a body of the common rail fuel system; and
- a temperature sensor being in direct contact with fuel within the common rail fuel system.

Embedded and/or attached sensors providing for indirect determination of the first temperature $T_1$ are cost effective and adds very little to the constructional complexity of the implementation. The sensors providing for direct measurement provide for quick and exact measurements.

According to an embodiment of the present invention, the second determining unit utilizes at least one sensor in the group of:
- a temperature sensor embedded in material of a body of the at least one injector;
- a temperature sensor being in direct contact with fuel within the at least one injector;
- a temperature sensor embedded in a part of a cooling system for the engine;
- a temperature sensor being in direct contact with coolant water flowing through a cooling system for the engine; and
- a temperature sensor being in direct contact with engine oil included in the engine.

Embedded sensors providing for indirect determination of the second temperature $T_2$ are cost effective and adds very little to the constructional complexity of the implementation. The sensors providing for direct measurement provide for quick and exact measurements.

Detailed exemplary embodiments and advantages of the pressurized fuel determination according to the invention will now be described with reference to the appended drawings illustrating some preferred embodiments.

BRIEF DESCRIPTION OF THE DRAWINGS

Embodiments of the invention are described in more detail with reference to attached drawings illustrating examples of embodiments of the invention in which.

DETAILED DESCRIPTION OF INVENTION

Figure 1:
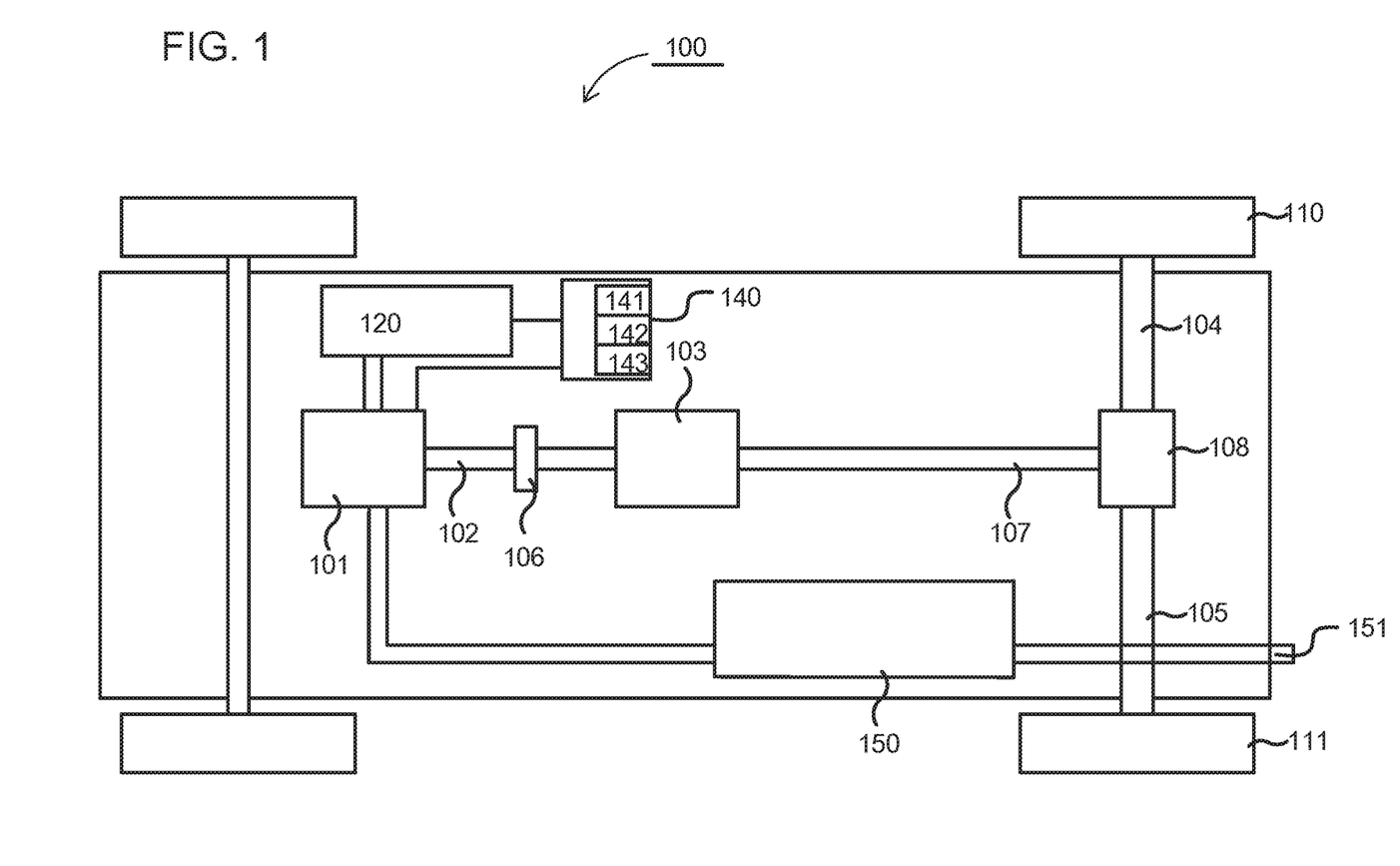
FIG. 1 schematically shows an example vehicle, in which the present invention may be implemented, FIGS. 2a-b schematically show examples of a fuel system, in which the present invention may be implemented according to various embodiments of the present invention.

FIG. 1 schematically shows an example vehicle 100, such as a car, a truck, a bus or a similar vehicle, which will be used to explain the present invention. The present invention is, however, not limited to use in vehicles as the one shown in FIG. 1, but may also be used in other vehicles and/or vessels including an engine and a high pressure fuel system including a common rail. The vehicle 100, shown schematically in FIG. 1, comprises a pair of driving wheels 110, 111. The vehicle furthermore comprises a powertrain with a combustion engine 101 providing power to the drive wheels 110, 111. The engine 101 may, for example, in a customary fashion, via an output shaft 102 of the engine 101, be connected with a gearbox 103, via a clutch 106 and an input shaft connected to the gearbox 103. A propeller shaft 107, connected to an output shaft or the gearbox 103, drives the driving wheels 110, 111 via a central gear 108, such as e.g. a customary differential, and drive shafts 104, 105 connected with the central gear 108.

The vehicle also includes a fuel system 120 being schematically illustrated in FIG. 1. The fuel system 120 is arranged for providing fuel to the engine 101.

A control unit 140 is in FIG. 1 schematically illustrated as receiving signals and/or providing control signals from and/or to the engine 101 and the fuel system 120. As described below, the control unit 140 may according to some embodiments of the present invention comprise a first determination unit 141, a second determination unit 142, and a third determination unit 143, and possibly also other herein mentioned units. These units are described in more detail below.

Figure 2A:
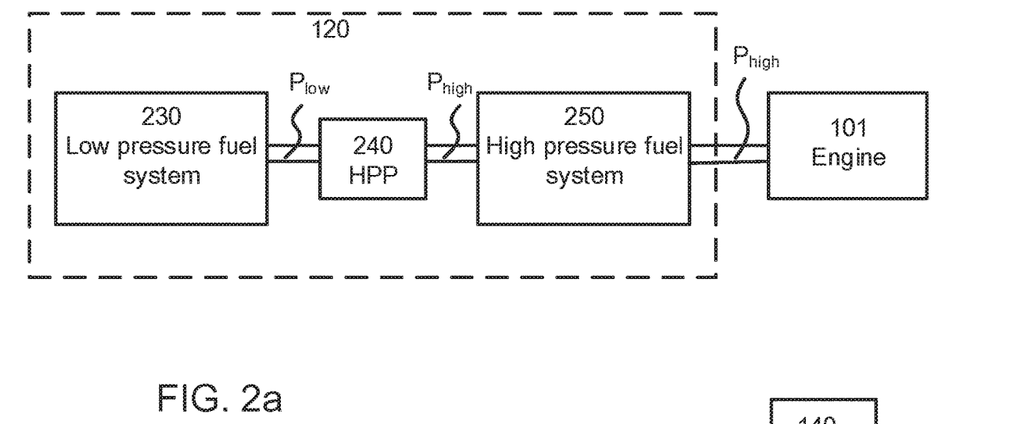

FIG. 2a schematically illustrates a fuel system 120. The fuel system 120 includes a low pressure fuel system 230, which may include one or more fuel tanks, one or more fuel pipes, one or more low pressure pumps, one or more filters, and one or more further components arranged for transporting fuel to the high pressure pump (HPP) 240. In the low pressure fuel system 230, the pressure $P_{low}$ of the fuel is rather low, e.g. in the range of 6-10 bar.

The fuel system 120 further includes the high pressure pump HPP 240, which is configured to increase the pressure of the fuel to a rather high pressure $P_{high}$, e.g. in the range 500-3000 bar.

The fuel system 120 further includes a high pressure fuel system 250, which may include a common fuel rail, one or more fuel pipes, one or more filters, and one or more further components arranged for transporting fuel to the engine 101. The high pressure pump 240 and the piping between the high pressure pump 240 and the high pressure fuel system 250 may be seen as at least partly included in the high pressure fuel system 250. The high pressure fuel system may 250 also include one or more other fuel pumps.

Figure 2B:
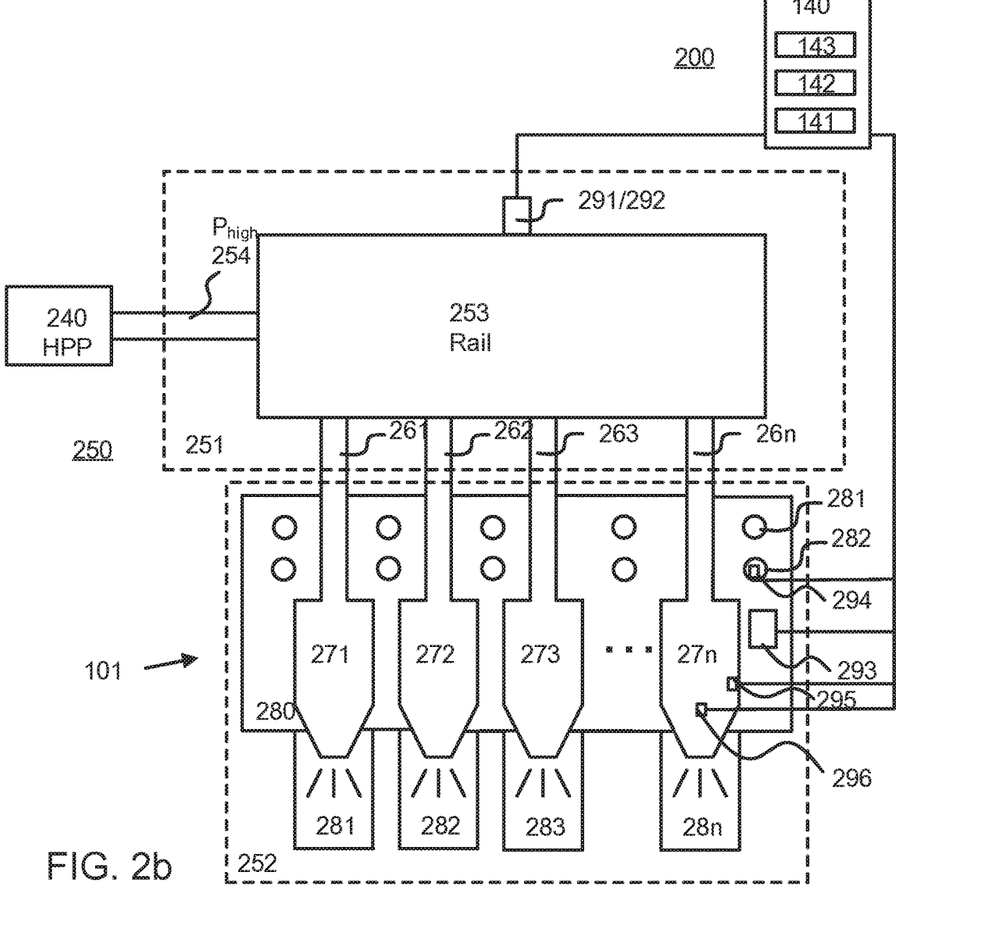

FIG. 2b schematically discloses an example of a high pressure fuel system 250, in which the present invention may be implemented, and a part of the engine 101. As stated above, a high pressure pump HPP 240 increases the pressure of the fuel in the system to a higher level $P_{high}$. The thereby pressurized fuel is provided to a common rail fuel system 253 via one or more fuel pipes 254. The common rail fuel system 253 provides fuel to the injectors 271, 272, 273, ..., 27n being arranged at least partly within a cylinder head 280 of the engine, and such that they can inject fuel into the cylinders 281, 282, 283, ..., 28n of the engine 101.

Each cylinder 281, 282, 283, ..., 28n is thus provided with pressurized fuel by a corresponding injector 271, 272, 273, ..., 27n being arranged for injecting pressurized fuel into that cylinder 281, 282, 283, ..., 28n. The pressurized fuel to be provided to all of the injectors 271, 272, 273, ..., 27n is kept pressurized in a common tank, i.e. in the common rail system 253, before being transferred to the injectors 271, 272, 273, ..., 27n via piping 261, 262, ..., 26n. The engine 101 may have essentially any suitable number of cylinders being provided with a corresponding number of injectors. In FIG. 2b, only a small number of cylinders and injectors, and also only a very small part of the engine 101 and the cylinder head 280, are illustrated in order to increase the intelligibility.

Figure 3:
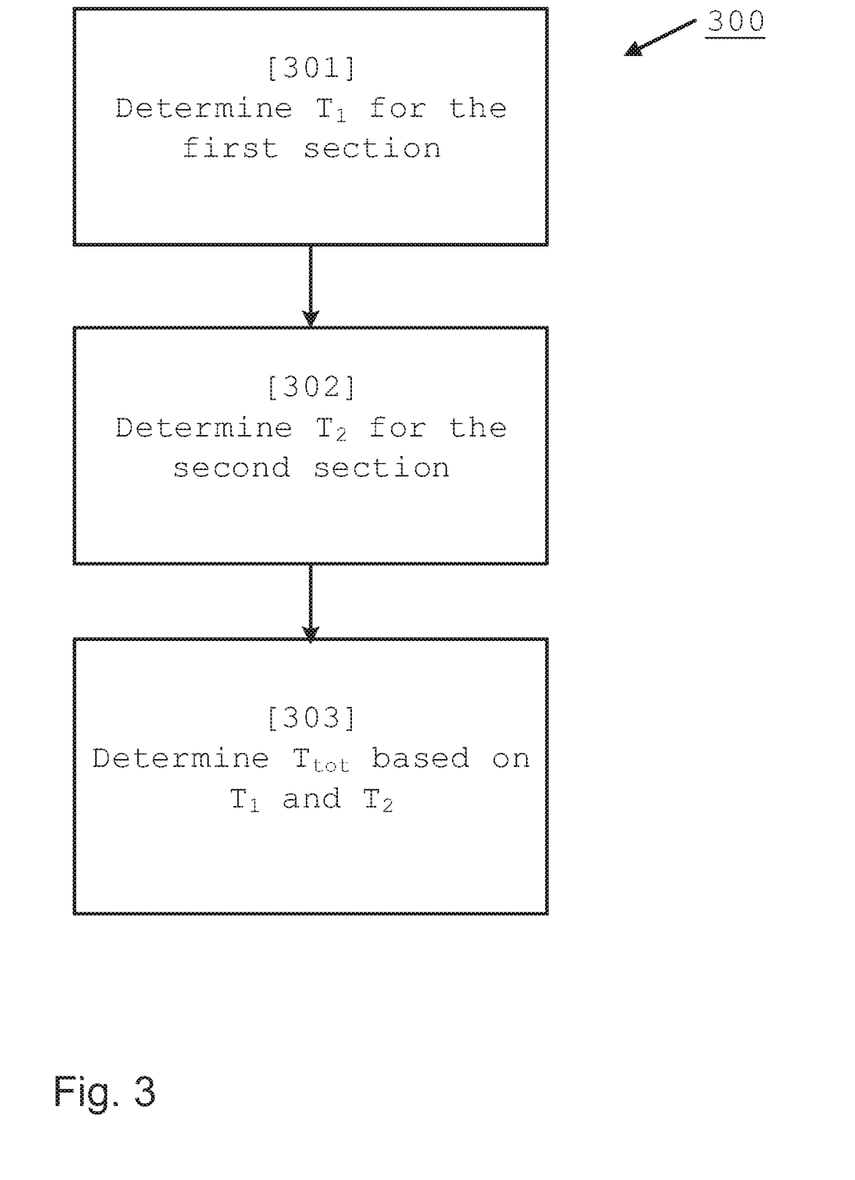
FIG. 3 shows a flow chart for a method according to the present the invention, FIG. 4 schematically shows some examples of sensors possibly being used according to some embodiments of the present invention.

FIG. 3 shows a flow chart diagram of a method for determining a temperature $T_{tot}$ for pressurized fuel included in a high pressure fuel system 250 according to an aspect of the present invention.

In a first step 301 of the method, a first temperature $T_1$ for a first fuel volume $V_1$ included in a first section 251 of the high pressure fuel system 250 is determined. The first section 251 includes at least the common rail fuel system 253, as is schematically illustrated in FIG. 2b.

In a second step 302 of the method, a second temperature $T_2$ for a second fuel volume $V_2$ included in a second section 252 of the high pressure fuel system 250 is determined. The second section 252 includes at least one fuel injector 271, 272, 273, ..., 27n arranged in a cylinder head 280 of the engine 101, as is schematically illustrated in FIG. 2b.

In a third step 303, a temperature $T_{tot}$ is determined for the pressurized fuel based at least on the first temperature $T_1$ and the second temperature $T_2$; $T_{tot}=f(T_1, T_2)$.

Thus, according to the present invention, a model for determining the temperature $T_{tot}$ is utilized. The model takes the first temperature $T_1$ and the second temperature $T_2$ into consideration when determining the temperature $T_{tot}$, whereby the temperature $T_{tot}$ may be modeled as depending on at least the first fuel temperature $T_1$ in the common rail fuel system 253 and on the second fuel temperature $T_2$ in the injectors.

It should be noted that the first 301 and second 302 steps may be performed in any suitable order.

This use of this model for the total temperature $T_{tot}$ simplifies the determination of the temperature $T_{tot}$. Also, the total temperature $T_{tot}$ for the fuel in the high pressure fuel system can hereby reliably be determined.

According to an embodiment of the present invention, the determination 303 of the temperature $T_{tot}$ is performed such that a mean temperature $T_{mean}$ is determined for a total volume $V_{tot}$ of the pressurized fuel included in the high pressure fuel system 250; $T_{tot}=T_{mean}$. The total/mean temperature $T_{tot}$ can be utilized when estimating the fuel weight/amount $Q_{est}$ being injected into the engine. Thus, since a reliable mean value for the fuel in the high pressure fuel system is provided by the embodiment of the present invention, the injected fuel weight/amount $Q_{est}$ can easily and reliably be estimated.

The total volume $V_{tot}$ here includes at least the volumes of the first 251 and second 252 sections, possibly including smaller fuel portions in piping and other fuel components of the high pressure fuel system 250, and the mean temperature $T_{mean}$ may be defined as a mean temperature for the whole/total pressurized fuel volume $V_{tot}$. Hereby, the mean temperature $T_{mean}$ of the pressurized fuel can continuously be determined. The continuously determined mean temperature may then be used by control systems e.g. in vehicles for a large number of estimations, calculations and/or adaptions, such as for calculating/estimating the injected fuel weight/amount $Q_{est}$, as described above.

The first section 251 may, as is illustrated in FIG. 2b, for example include fuel in the piping 254 between the high pressure pump 240 of the high pressure fuel system 250 and the common rail fuel system 253, fuel in the common rail fuel system 253, and fuel in a first part of the piping 261, 262, 263, ..., 26n between the common rail fuel system 253 and the at least one fuel injector 271, 272, 273, ..., 27n, wherein the first part is external from the cylinder head 280 of the engine 101. This may also be described as the first section 251 includes the parts of the high pressure fuel system being arranged outside/separate of the engine/cylinder block 280, e.g. in free air. As described above, the corresponding first volume $V_1$ is the fuel being included in the first section 251, which may for example be approximately 50% of the total fuel volume $V_{tot}$ for some implementations.

The second section 252 may correspondingly include the at least one fuel injector 271, 272, 273, ..., 27n, and a second part of the piping 261, 262, 263, ..., 26n between the common rail fuel system 253 and the at least one fuel injector 271, 272, 273, ..., 27n, wherein the second part is essentially/at least partly embedded within the cylinder head 280 of the engine 101. This may also be described as the second section 252 essentially includes the parts of the high pressure fuel system being arranged within the engine/cylinder block 280. As described above, the corresponding second volume $V_2$ is the fuel being included in the second section 252, which may for example be approximately 50% of the total fuel volume $V_{tot}$ for some implementations.

According to an embodiment of the present invention, the determination 303 of the temperature $T_{tot}$ may include weighting the first temperature $T_1$ of the first section 251 with the first volume $V_1$ of the first section 251, e.g. including the common rail volume. The determination 303 of the temperature $T_{tot}$ may also include weighting the second temperature $T_2$ of the second section 252 with the second volume $V_2$ of the second section, e.g. including the volume of the injectors 271, 272, 273, ..., 27n. The temperature $T_{tot}$ may then be determined as: $T_{tot}=T_1*V_1+T_2*V_2/V_1+V_2$, whereby a reliable method for determining the temperature $T_{tot}$, which also takes the different volumes of the sections into account, is provided.

It should be noted that the present invention is not restricted to usage of only two section volumes, i.e. the first $V_1$ and second $V_2$ section volumes, and to two section temperatures, i.e. the first $T_1$ and second $T_2$ section temperatures. The present invention may thus be generally utilized for essentially any number of sections 251, 252, ..., 25n, volumes $V_1, V_2, \ldots, V_n$, and temperatures $T_1, T_2, \ldots, T_n$, i.e. $T_{tot} = f(T_1, T_2, \ldots T_n)$ and $$T_{tot} = \frac{T_1 * V_1 + T_2 * V_2 + \ldots T_n * V_n}{V_1 + V_2 + \ldots V_n},$$

respectively.

Figure 4:
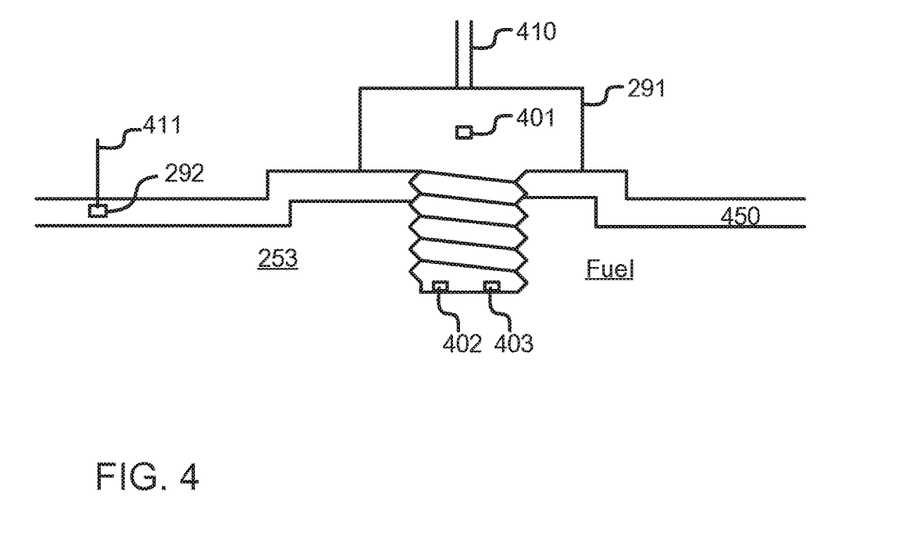

According to an embodiment of the present invention, the determination 301 of the first temperature $T_1$ includes measuring a rail body temperature $T_{rail\_body}$ for the common rail fuel system 253 and providing sensor signals to a control unit via a signal connection 411. Such a rail body temperature $T_{rail\_body}$ may be measured by usage of a temperature sensor 292 included/embedded in the material of a body 450 of the common rail fuel system 253, as is schematically illustrated in FIGS. 2b and 4. The rail body temperature $T_{rail\_body}$ has a predetermined/known relationship to, e.g. has a predetermined/known correlation with, the temperature of the fuel in the common rail 253, which may be used for determining the first temperature $T_1$.

The rail body temperature $T_{rail\_body}$ may also be measured by usage of a temperature sensor 291 attached to the body 450 of the common rail fuel system 253 e.g. by being screwed into the common rail body 450, as is schematically illustrated in FIGS. 2b and 4. The temperature sensor 291 may then include a temperature sensing unit 401 embedded within the body of the temperature sensor 291, i.e. separate from the fuel in the common rail 253. The rail body temperature $T_{rail\_body}$, and therefore also the temperature being measured by the embedded temperature sensing unit 401, has a predetermined/known relationship to, e.g. has a predetermined/known correlation with, the temperature of the fuel in the common rail 253, which may be used for determining the first temperature $T_1$.

The temperature sensor 291 may, according to an embodiment, also be a combined sensor arrangement including the embedded temperature sensing unit 401 and a pressure sensing unit 402 being in contact with the fuel.

In prior art common rail systems, a pressure sensing unit 402 included in a pressure sensor is often arranged in contact with the fuel in the common rail in order to keep track of pressure changes during fuel injections and to provide sensor signals to a control unit via a signal connection 410. According to this embodiment of the present invention, however, this pressure sensor may be exchanged with a sensor 291 including both a pressure sensing unit 402 and a temperature sensing unit 401. Thus, the temperature sensor 291 may be implemented with very little additional complexity, since a sensor normally being present in the common rail may easily be exchanged with the combined temperature and pressure sensor 291 according to the embodiment.

The first fuel temperature $T_1$ may thus be indirectly determined based on the measured rail body temperature $T_{rail\_body}$, according to the above described embodiments, whereby an efficient and reliable indirect determination of the first fuel temperature $T_1$ is achieved.

Alternatively, according to another embodiment of the present invention, the determination of the first temperature $T_1$ includes a direct measurement of a fuel temperature $T_{rail\_fuel}$ for fuel within the common rail fuel system 253. Here, a temperature sensing unit 403 may be arranged in contact with the fuel, e.g. next to the pressure sensing unit 402 in the temperature sensor 291, as schematically illustrated in FIGS. 2b and 4.

Also, the determination of the first temperature $T_1$ may, according to an embodiment, include a combination of direct and indirect measurements, e.g. using one or more of the above mentioned temperature sensing units 401, 403 and/or sensors 291, 292.

According to an embodiment of the present invention, the determination 302 of the second temperature $T_2$ includes determining and/or measuring at least one injector body temperature $T_{inject\_body}$ for the at least one injector 271, 272, 273, ..., 27n. Here, at least one temperature sensor 295 embedded in the material of a body of the at least one injector 271, 272, 273, ..., 27n may be utilised for the determination, as is schematically illustrated in FIG. 2b. The second temperature $T_2$ for the fuel e.g. in the injectors, is then indirectly determined based on the at least one measured injector body temperature $T_{inject\_body}$. The injector body temperature $T_{inject\_body}$ has a predetermined/known relationship to, e.g. has a predetermined/known correlation with, the temperature of the fuel in the at least one injector 271, 272, 273, ..., 27n, which may be used for determining the second temperature $T_2$.

Alternatively, the second temperature $T_2$ for the fuel e.g. in the injectors may, according to an embodiment, be directly measured by usage of a temperature sensor 296 being in direct contact with fuel within the at least one injector 271, 272, 273, ..., 27n, as is schematically illustrated in FIG. 2b.

According to an embodiment of the present invention, the second temperature $T_2$ may also be determined indirectly based on a coolant temperature $T_{coolant}$. At least one coolant temperature $T_{coolant}$ for coolant water flowing through the cylinder head 280 of the motor is then determined and/or measured. This determination and/or measurement may for example be performed by usage of a temperature sensor 293 embedded in a part of a cooling system 281, 282 arranged for regulating a temperature $T_{engine}$ for the engine 101 and/or by usage of a temperature sensor 294 being in direct contact with coolant water flowing through the cooling system 281, 282, as is schematically illustrated in FIG. 2b. Then, the second temperature $T_2$ for the fuel in e.g. the injectors is determined based on the at least one coolant temperature $T_{coolant}$. The at least one coolant temperature $T_{coolant}$ has a predetermined/known relationship to, e.g. have a strong correlation with, the second temperature $T_2$, which is used for determining the second temperature $T_2$. Coolant water temperature sensors 293, 294 are generally implemented in engine cooling systems today. The embodiment may therefore be implemented without addition to the mechanical complexity of the engine cooling systems.

According to an embodiment of the present invention, the second temperature $T_2$ may also be determined indirectly based on an engine oil temperature $T_{oil}$. Here, the engine oil temperature $T_{oil}$ may e.g. be measured by usage of a temperature sensor being in direct contact with engine oil included in the engine 101. Then, the second temperature $T_2$ for the fuel in e.g. the injectors is determined based on the engine oil temperature $T_{oil}$, which is possible since there is a known/predetermined relationship/correlation between the engine oil temperature $T_{oil}$ and the second temperature $T_2$.

Also, the determination of the second temperature $T_2$ may, according to an embodiment, include a combination of direct and indirect determinations/measurements, e.g. using one or more of the above mentioned temperature sensors 293, 294, 295, 296.

According to an embodiment of the present invention, the above described determination 303 of the temperature $T_{tot}$ for the pressurized fuel is based also on at least one additional parameter $Par_{add}$; $T_{tot}=f(T_1, T_2, Par_{add})$. This at least one additional parameter $Par_{add}$ may here be related to the fuel system and/or to the vehicle 100 in which the high pressure fuel system 250 may be included. In general, for engine and/or fuel systems, there may be a number of parameters/factors that influence the temperature $T_{tot}$, such as e.g. ambient effects influencing the high pressure fuel system 250 and/or the engine 101. These parameters/factors may differ for different implementations of the engine and/or fuel systems e.g. in vehicles and in vessels. These parameters/factors may also differ between implementations e.g. in different types of vehicles, or in different types of vessels. These parameters/factors may also differ between vehicle individuals or vessel individuals. Basically, anything that influences the temperature $T_{tot}$ may be taken into account as an additional parameter when determining the temperature $T_{tot}$. These parameters/factors may also vary over time.

The at least one additional parameter $Par_{add}$ may include a layout for an engine house in which the high pressure fuel system 250 is located, and/or a design or position/location of the high pressure fuel system 250. The space/room in which the high pressure fuel system 250, and possibly also the engine 101, is mounted may be arranged in different ways, which may influence e.g. how much the high pressure fuel system 250 is cooled down by air flowing/passing through the high pressure fuel system 250. For example, some high pressure fuel systems 250, and possibly also some engines 101, are at least partly encapsulated in covering/insulating material, which then reduces the cooling effect from air currents flowing/passing by the high pressure fuel system 250. Other high pressure fuel systems 250, however, are arranged more openly, without insulating material, which enhances a cooling down effect provided by flowing/passing air.

The at least one additional parameter $Par_{add}$ may also include an environmental temperature surrounding the high pressure fuel system 250 and e.g. a vehicle in which the system is implemented and/or a velocity of the vehicle 100. The cooling effect on the high pressure fuel system 250, provided by surrounding air due to e.g. the air temperature, the speed of the vehicle and/or the layout for the high pressure fuel system 250, may also be included in the at least one additional parameter $Par_{add}$. For example, a cooler surrounding air and a higher vehicle speed would generally result in a greater cooling effect on the temperature $T_{tot}$ than a warmer surrounding air and a lower vehicle speed would result in.

Also, a fuel flow through the high pressure fuel system 250 may be included in the one or more additional parameters $Par_{add}$, since the fuel flow influences how much time the fuel might be influenced by the surrounding temperature. A lower fuel flow facilitates that the fuel is warmed up more by warm components, such as the high pressure pump, being passed by the fuel on its way to the injectors than for higher fuel flow. Correspondingly, a lower fuel flow facilitates that the fuel is cooled down more by surrounding air, e.g. in the common rail system.

Also, an efficiency of the cooling system, such as e.g. an effect of a cooling fan, may be included in the one or more additional parameters $Par_{add}$.

By taking also one or more additional parameters $Par_{add}$ into account when determining the temperature; $T_{tot}=f(T_1, T_2, Par_{add})$; a more exact determination, based also e.g. on ambient parameters, is achieved.

As mentioned above, there is a relationship between the fuel weight, the volume V, the pressure drop $\Delta P$ and the speed of sound c, which may be defined as $$Q_{est} = \frac{V}{c^2} * \Delta P.$$

If the injected fuel weight Q is known, e.g. after having been estimated as described above, the relationship may, according to an embodiment, also be used for determining the speed of sound for the fuel currently used;

$$c = \sqrt{\frac{V*\Delta P}{Q}}.$$

When the speed of sound c has been determined for the fuel, the type of fuel may also be determined, since different kinds of fuel, such as diesel, petrol and ehtanol, have different values for the speed of sound c. Hereby, the type of fuel may easily and reliably be determined.

The person skilled in the art will appreciate that the method and embodiments for determining a temperature $T_{tot}$ for pressurized fuel included in a high pressure fuel system according to the present invention can also be implemented in a computer program, which, when it is executed in a computer, instructs the computer to execute the method. The computer program is usually constituted by a computer program product 503 stored on a non-transitory/non-volatile digital storage medium, in which the computer program is incorporated in the computer-readable medium of the computer program product. The computer-readable medium includes a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 5:
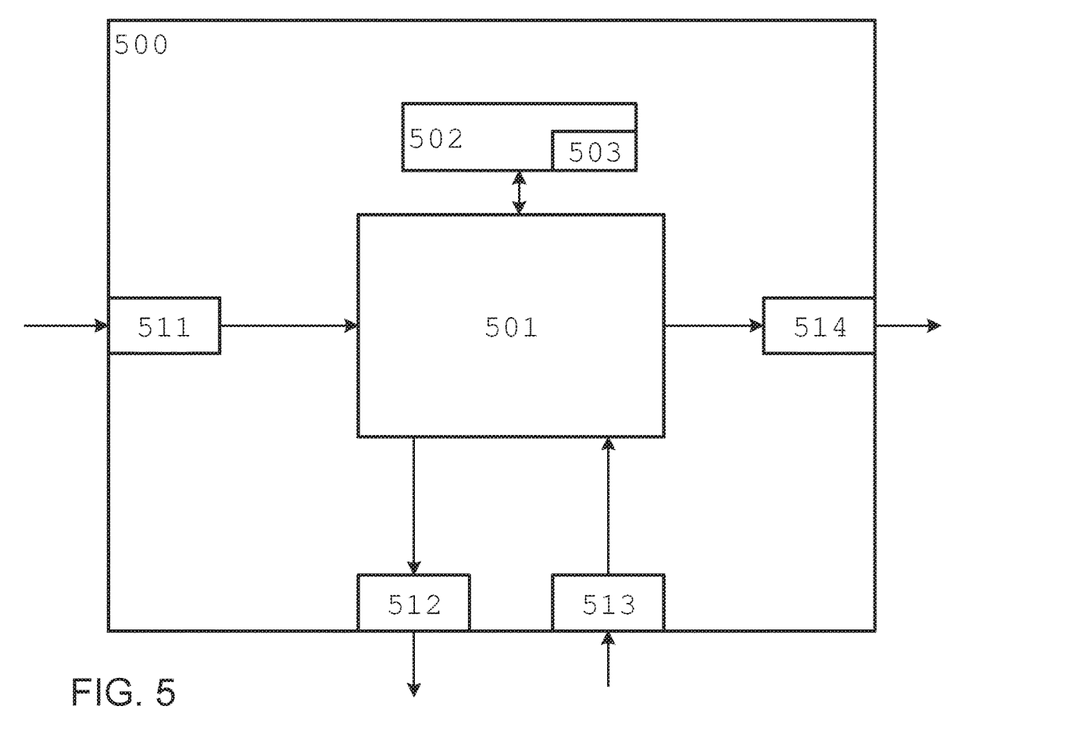
FIG. 5 shows a control device/unit, in which a method according to the present invention may be implemented.

FIG. 5 shows in schematic representation a control unit 500. The control unit 500 comprises a computing unit 501, which can comprise essentially any suitable type of processor or microcomputer, for example a circuit for digital signal processing (Digital Signal Processor, DSP), or a circuit having a predetermined specific function (Application Specific Integrated Circuit, ASIC). The computing unit 501 is connected to a memory unit 502 arranged in the control unit 500, which memory unit provides the computing unit 501 with, for example, the stored program code and/or the stored data which the computing unit 501 requires to be able to perform computations. The computing unit 501 is also arranged to store partial or final results of computations in the memory unit 502.

In addition, the control unit 500 is provided with devices 511, 512, 513, 514 for receiving and transmitting input and output signals. These input and output signals can include waveforms, impulses, or other attributes which, by the devices 511, 513 for the reception of input signals, can be detected as information and can be converted into signals which can be processed by the computing unit 501. These signals are then made available to the computing unit 501. The devices 512, 514 for the transmission of output signals are arranged to convert signals received from the computing unit 501 in order to create output signals by, for example, modulating the signals, that may be transmitted to other parts of and/or systems in e.g. a vehicle.

Each of the connections to the devices for receiving and transmitting input and output signals may include one or more of a cable; a data bus, such as a CAN bus (Controller Area Network bus), a MOST bus (Media Orientated Systems Transport bus), or some other bus configuration; or a wireless connection. A person skilled in the art will appreciate that the above-stated computer may correspond to the computing unit 501 and that the above-stated memory can comprise the memory unit 502.

Control systems in modern vehicles commonly include communication bus systems comprising of one or more communication buses for linking a number of electronic control units (ECU's), or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1, 2b and 5, which is well known to the person skilled in the art within this technical field.

According to an aspect of the present invention, a system 200 for determining a temperature $T_{tot}$ for pressurized fuel included in a high pressure fuel system 250 arranged for providing fuel to an engine 101 is provided. The system 200 is schematically illustrated in FIG. 2b.

The system includes a first determining unit 141, which is arranged for determining 301 a first temperature $T_1$ for a first fuel volume $V_1$ included in a first section 251 of the high pressure fuel system 250. As is described above, the first section 251 includes at least a common rail fuel system 253. The first determining unit 141 may also be arranged for determining 301 the first temperature $T_1$ according to one or more of the above described embodiments for determining the first temperature $T_1$, including usage of e.g. direct and/or indirect determination of the first temperature $T_1$.

The system 200 further includes a second determining unit 142 arranged for determining 302 a second temperature $T_2$ for a second fuel volume $V_2$ included in a second section 252 of the high pressure fuel system 250. As described above, the second section 252 includes at least one fuel injector 271, 272, 273, ..., 27n arranged in a cylinder head 280 of the engine 101. The second determining unit 142 may also be arranged for determining 301 the second temperature $T_2$ according to one or more of the above described embodiments for determining the second temperature $T_2$, including using direct and/or indirect determination of the second temperature $T_2$.

The system 200 further includes a third determining unit 143 arranged for determining 303 the temperature $T_{tot}$ for the pressurized fuel included in the high pressure fuel system 250 based at least on the first temperature $T_1$ and the second temperature $T_2$; $T_{tot}=f(T_1, T_2)$. The third determination unit 143 may also be arranged for determining the temperature $T_{tot}$ according to one or more of the above described embodiments.

In the illustrated embodiments, the present invention is implemented in one control unit 140, 500. The invention can also, however, be implemented wholly or partially in one or more other control units already present in the vehicle, or in some control units dedicated to the present invention.

Here and in this document, units are often described as being arranged for performing steps of the method according to the invention. This also includes that the units are designed to and/or configured to perform these method steps.

The at least one control unit 140 is in FIGS. 1 and 2b illustrated as including separately illustrated units 141, 142, 143. These units 141, 142, 143 may, however be logically separated but physically implemented in the same unit, or can be both logically and physically arranged together. These units 141, 142, 143 may for example correspond to groups of instructions, which can be in the form of programming code, that are input into, and are utilized by a processor/computing unit when the units are active and/or are utilized for performing its method step, respectively.

As mentioned above and illustrated in FIGS. 2b and 4, the system 200 according to the present invention may include, and/or the first determining unit 141 may utilize, a temperature sensor 292 being embedded in material of the body 450 of the common rail 253, a temperature sensor 291 attached to the body 450 of the common rail 253, and/or a temperature sensor 291 being in direct contact with fuel within the common rail 253.

Also, as mentioned above and illustrated in FIG. 2b, the system 200 according to the present invention may include, and/or the second determining unit 142 may utilize a temperature sensor 295 embedded in material of a body of the at least one injector 271, 272, 273, ..., 27n, a temperature sensor 296 being in direct contact with fuel within the at least one injector 271, 272, 273, ..., 27n, a temperature sensor 293 embedded in a part of the cooling system 281, 282, a temperature sensor 294 being in direct contact with coolant water flowing through a cooling system 281, 282, and/or a temperature sensor being in direct contact with engine oil being included/used in the engine 101 as lubricant.

The system 200 according to the present invention may be arranged for performing all of the above, in the claims, and in the herein described embodiments method steps. The system is hereby provided with the above described advantages for each respective embodiment. Thus, a skilled person also realizes that the above described system can be modified according to the different embodiments of the method of the present invention. The present invention is also related to a vehicle 100, such as a truck, a bus or a car, including the herein described system for determining a temperature $T_{tot}$ for pressurized fuel included in a high pressure fuel system.

The present invention is not limited to the above described embodiments. Instead, the present invention relates to, and encompasses all different embodiments being included within the scope of the independent claims.

The invention claimed is:

1. A method for determining a total temperature for pressurized fuel included in a high pressure fuel system arranged for providing fuel to an engine, said method comprising:
    determining a first temperature for a first fuel volume included in a first section of said high pressure fuel system, said first section including a common rail fuel system;
    determining a second temperature for a second fuel volume included in a second section of said high pressure fuel system, said second section including at least one fuel injector arranged in a cylinder head; and
    determining said total temperature for said pressurized fuel based at least on said first temperature and said second temperature.

2. The method as claimed in claim 1, wherein said determining of said total temperature for said pressurized fuel includes weighting said first temperature with said first volume and weighting said second temperature with said second.

3. The method as claimed in claim 1 wherein said total temperature $T_{tot}$ is determined as a mean temperature; for a total volume of pressurized fuel included in said high pressure fuel system.

4. The method as claimed in claim 1, wherein said determining of said first temperature $T_1$ includes:
measuring a rail body temperature for said common rail fuel system; and
determining said first temperature based on said rail body temperature.

5. The method as claimed in claim 1 wherein said determining of said first temperature includes direct measurement of a fuel temperature for fuel within said common rail fuel system.

6. The method as claimed in claim 1, wherein said determining of said second temperature includes:
measuring at least one injector body temperature for said at least one fuel injector; and
determining said second temperature based on said at least one injector body temperature.

7. The method as claimed in claim 1, wherein said determining of said second temperature includes direct measurement of at least one fuel temperature for fuel within at said least one fuel injector.

8. The method as claimed in claim 1, wherein said determining of said second temperature includes:
measuring at least one coolant temperature for coolant water flowing through said cylinder head; and
determining said second temperature based on said at least one coolant temperature.

9. The method as claimed in claim 1, wherein said determining of said temperature for said pressurized fuel is based also on at least one additional parameter being related to said fuel system and/or to a vehicle in which said high pressure fuel system is included.

10. The method as claimed in claim 9, wherein said at least one additional parameter includes one or more in the group:
a fuel flow through said high pressure fuel system;
a placement of said high pressure fuel system;
a layout for an engine house in which said high pressure fuel system is located;
an effect of a cooling fan of a cooling system arranged for cooling said engine;
an environmental temperature surrounding said high pressure fuel system;
a cooling effect on said high pressure fuel system provided by surrounding air;
a velocity of said vehicle; and/or
a fuel pressure.

11. A computer program product stored on a non-transitory computer-readable medium, said computer program product for determining a total temperature for pressurized fuel included in a high pressure fuel system arranged for providing fuel to an engine, said computer program product comprising computer instructions to cause one or more electronic control units or computers to perform the following operations:

determining a first temperature for a first fuel volume included in a first section of said high pressure fuel system, said first section including a common rail fuel system;
determining a second temperature for a second fuel volume included in a second section of said high pressure fuel system, said second section including at least one fuel injector arranged in a cylinder head; and
determining said total temperature for said pressurized fuel based at least on said first temperature and said second temperature.

12. A system for determining a temperature for pressurized fuel included in a high pressure fuel system arranged for providing fuel to an engine, said system comprising:
a first determining unit arranged for determining a first temperature for a first fuel volume included in a first section of said high pressure fuel system, said first section including a common rail fuel system;
a second determining unit arranged for determining a second temperature for a second fuel volume included in a second section of said high pressure fuel system, said second section including at least one fuel injector arranged in a cylinder head of said engine; and
a third determining unit arranged for determining said temperature for said pressurized fuel based at least on said first temperature and said second temperature.

13. The system as claimed in claim 12, wherein said first determining unit utilizes at least one sensor in the group of:
a temperature sensor embedded in material of a body of said common rail fuel system;
a temperature sensor attached to a body of said common rail fuel system; and
a temperature sensor being in direct contact with fuel within said common rail fuel system.

14. The system as claimed in claim 12, wherein said second determining unit utilizes at least one sensor in the group of:
a temperature sensor embedded in material of a body of said at least one injector;
a temperature sensor being in direct contact with fuel within said at least one injector;
a temperature sensor embedded in a part of a cooling system for said engine;
a temperature sensor being in direct contact with coolant water flowing through a cooling system for said engine; and/or
a temperature sensor being in direct contact with engine oil included in said engine.

15. The method as claimed in claim 1, wherein said determining of said total temperature $T_{tot}$ for said pressurized fuel includes weighting said first temperature $T_1$ with said first volume $V_1$ and weighting said second temperature $T_2$ with said second volume $V_2$ via the formula:

$$T_{tot} = \frac{T_1 * V_1 + T_2 * V_2}{V_1 + V_2}.$$

* * * * *